March 3, 1970  F. E. BICHAYLO ETAL  3,498,815
METHOD OF APPLICATION AND DETECTION OF INVISIBLE
INK ON CONTAINERS
Filed March 1, 1967  2 Sheets-Sheet 1
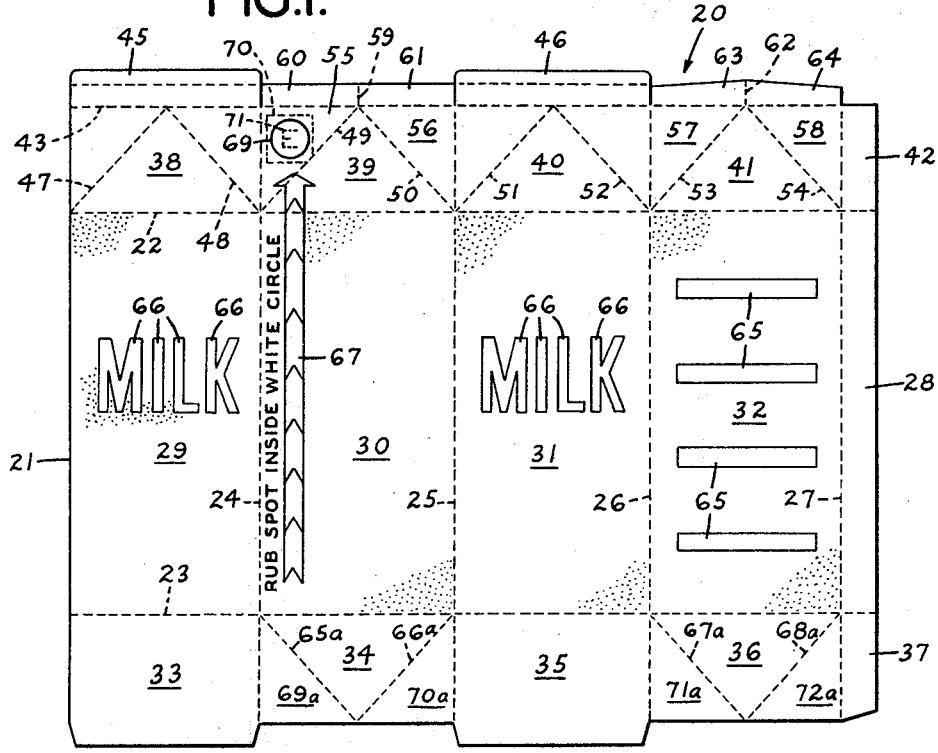
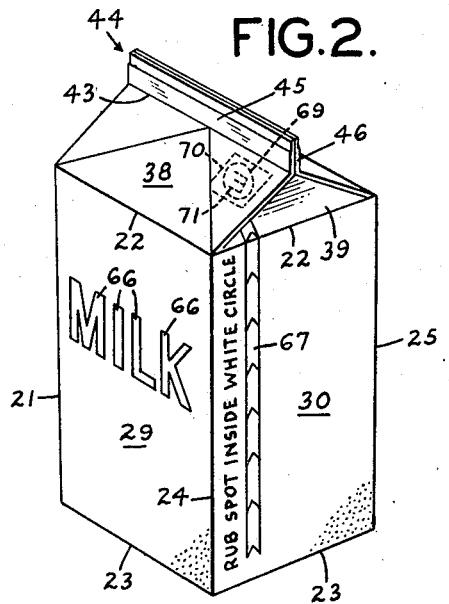
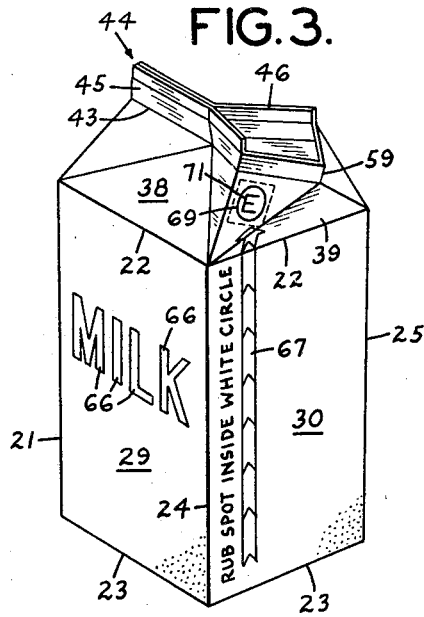

March 3, 1970   F. E. BICHAYLO ET AL   3,498,815
METHOD OF APPLICATION AND DETECTION OF INVISIBLE
INK ON CONTAINERS
Filed March 1, 1967   2 Sheets-Sheet 2

United States Patent Office 3,498,815
Patented Mar. 3, 1970

3,498,815
METHOD OF APPLICATION AND DETECTION OF INVISIBLE INK ON CONTAINERS
Frederick E. Bichaylo, Marlton, N.J., and Harold B. Moors, Richboro, and Emanuel F. Scariano, Holland, Pa., assignors to International Paper Company, New York, N.Y., a corporation of New York
Filed Mar. 1, 1967, Ser. No. 619,636
Int. Cl. B44f 1/10; B44d 1/14
U.S. Cl. 117—1.7     3 Claims

ABSTRACT OF THE DISCLOSURE

A method for printing invisible marks on a paper or plastic container or bag for merchandising products is provided which comprises a first printing operation using an alkali-sensitive colored ink to cover an area of the container surface followed by a second printing operation using an alkali-resistant transparent ink to form a desired invisible mark. Upon subsequent application of an alkaline solution capable of reacting preferentially with the alkaline-sensitive ink, the invisible mark will become visible.

---

The present invention relates to a method of applying and detecting invisible or sympathetic ink on containers or bags and, more particularly, on containers made from thermoplastic-coated paper.

In the packaging industry, thermoplastic-coated paper containers have been widely used as containers for liquids and, notably, polyethylene-coated paper containers have been widely used for merchandising dairy products, fruit juices and other beverages intended for human consumption. The packaging industry has also widely used plastic or paper containers or bags for ice cream cartons, bread wraps, potato chip bags, etc., such containers having been formed from plastic and films such as Mylar, polypropylene, cellophane or vinyl as well as various grades of paper, kraft or paper board. The blanks for any of the above containers are commonly printed by a flexographic process using an alkali-sensitive flexographic ink to form appropriate designs including both solid areas and printed words.

In connection with sales promotion campaigns for the types of consumer products merchandised in the above types of containers, for example, milk and dairy products, it has been found desirable, in order to stimulate purchase and consumption of the product, to offer a prize or premium to a consumer who discovers a designated mark, letter, or series of marks and letters on the container. Of course, if the designated mark or letter were clearly visible on the container the sales promotion campaign would be unsuccessful since the consumer would be tempted to sort through the retailer's stock in order to select the winning mark or series of marks. Since many containers have no surface area on which a mark may be placed so as to be invisible prior to opening the container, it is often necessary to place the mark in an accessible position on the container. In order to prevent premature discovery of the mark, the mark must be applied so as to be invisible or substantially invisible until the consumer performs an operation which renders the mark visible.

Heretofore, invisible inks have been available based upon materials which changed color due to a reaction produced by light, heat or chemicals. However, the detection devices required with such inks are generally not available in the home and frequently are dangerous to use. For example, the application of heat to a paper or plastic container would likely result in a hazardous fire condition.

Accordingly, the principal object of the present invention is to provide a method for printing an invisible mark on a paper or plastic container which can be safely and easily rendered visible by a consumer.

A specific object of the present invention is to provide a method for printing an invisible mark using an alkali-resistant transparent ink over an alkali-sensitive ink applied to the surface of the container.

Other and further objects, features and advantages of the invention will appear more fully from the following description of the invention.

In accordance with the invention, any desired substrate material, such as a polyethylene-coated paper which may be used to form a paper container, is first printed with an alkali-sensitive flexographic ink to form the desired design of printed matter and associated art work. Many varieties of alkaline-sensitive flexographic ink can be used for this first printing operation, depending upon the desired color, gloss, transparency and reflectance characteristics and the specific nature of the substrate material. Such inks are well-known to the art and generally contain, in addition to a desired pigment or dye, a binder of shellac or nitrocellulose and a solvent such as ethyl alcohol. At some location in the design, a solid printed area of approximately two square inches is provided. Following the first printing operation, at least the solid printed area is overprinted with a substantially transparent alkali-resistant ink with a reverse printed mark or letter formed in the printed area. Alternatively, the substantially transparent alkali-resistant ink may be applied only in the form of the desired mark or letter. Preferably, the ink used for overprinting should be as transparent as possible and should have gloss and reflectance characteristics similar to those of the colored ink used in the first printing operation. Additionally, the invisible ink should possess good adhesion and scuff resistance.

So far as presently known, the greatest utility of the present invention is in connection with the marking of plastic and paper containers used for consumer goods. However, the principles of the present invention may also be applied to other articles such as tickets to rallies and sporting events, raffles and lotteries, and sales promotion campaigns for magazines.

The invention will now be described in greater detail with reference to the appended drawings in which:

FIG. 1 is a plan view illustrating the outside surface of a gable top container blank showing the scoring lines and a preferred location for the invisible mark;

FIG. 2 is a perspective view of a closed gable top container illustrating in phantom the invisible mark;

FIG. 3 is a perspective view of an opened gable top container showing the invisible mark in a preferred location;

Figure 4:
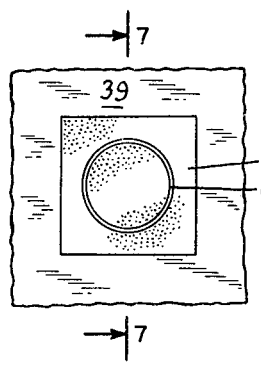
FIG. 4 is an enlarged fragmentary view of a substrate showing a colored alkali-sensitive inked area.

Referring now to the drawing, and more particularly to FIGS. 1, 2 and 3, a gable top carton of the type used for dairy products is formed from a blank 20 which is a single sheet of paper coated on both sides with polyethylene. The coated board is cut and scored so that when the carton is formed it assumes the shape of a rectangular container with a flat bottom and a gable top.

FIG. 1 represents the surface of the blank which will become the outside of the container while FIG. 2 illustrates the completed container in the closed position and FIG. 3 illustrates the completed container after it has been opened. A central portion 21 of the blank between the transverse score lines 22 and 23 becomes the body of the container. Vertical score lines 24, 25, 26 and 27 divide the blank into a side panel 29, a rear panel 30, a side panel 31, a front panel 32 and a flap 28. Connected to and integral with the lower edges of the panels 28–32 are bottom closure flaps 37, 33, 34, 35 and 36. Integral with the upper ends of the panels 28–32 are top closure flaps 42, 38, 39, 40 and 41.

The portions of flaps 38–41 above the transverse score line 43 form an upright rib 44 (FIGS. 2 and 3). Panels 38 and 40 become the sloping portions of the top closure while panels 45 and 46 form part of the rib 44.

Each of the panels 38–41 are formed with a pair of diagonal score lines 47–48, 49–50, 51–52, 53 and 54. Diagonal score lines 49 and 50 form fold-back panels 55, 56 from panel 39 and similarly diagonal score lines 53, 54 form fold-back panels 57, 58 from panel 41.

The upward extension of panel 39 above the transverse score line 43 is divided by a vertical score line 59 into two inner rib panels 60 and 61. Similarly, the upward extension of the panel 41 above the transverse score line 43 is divided by a vertical score line 62 into two inner rib panels 63 and 64.

Diagonal score line 52 in panel 40 and diagonal score line 47 in panel 38 are provided to facilitate the opening of the carton spout, as will be described hereafter, in like manner, diagonal score line 48 in panel 38 and diagonal score line 51 in panel 40 are provided to facilitate the opening of the back portion of the carton top, as will be described hereafter.

In the bottom portion of the carton diagonal score lines 65a and 66a are provided to form fold-back panels 69a and 70a from panel 34 and diagonal score lines 67a and 68a are provided to form fold-back panels 71a and 72a from panel 36.

In forming the carton, the first step is to fold the blank along vertical score lines 25 and 27 so that the flaps 28, 37 and 42 underlie, respectively, panels 29, 33 and 38. Prior to bringing these surfaces together, they should be heated to a temperature sufficient to soften the polyethylene coating, i.e. a temperature in the range of 250 to 600° F. When these surfaces are brought together under pressure, a heat-seal will be formed so as to provide a liquid-tight side seam for the carton. Ordinarily, this operation will be performed prior to shipping the blanks from the blank-forming plant.

To set up the carton prior to filling, the side-sealed blank will be opened to form a rectangular tube. Bottom front and back panels 34 and 36 will then be pressed inwardly along the score lines 65a, 66a, 67a and 68a and the bottom side panels 33 and 35 pressed inwardly to overlie panels 34 and 36. The carton bottom is then heat-sealed to form a liquid-tight carton bottom in a manner well known to the art.

After filling the carton, the top is formed and sealed to produce the configuration shown in FIG. 2. Closing of the top is accomplished by applying pressure to the front and back top panels 41 and 39 so as to fold the panels on the score lines 53, 54, 49 and 50. When the fold-back panels 55, 58, 57 and 56 have been positioned so as to underlie, respectively, panels 38 and 40, rib panels 45 and 46 and inner rib panels 60, 61, 63 and 64 will be aligned and may be heat-sealed to form upright rib 44.

To open the filled carton, an upward and outward force may be applied to the carton top to fold the panels 38 and 40 along score lines 47 and 52, thereby breaking the heat-sealed joint in the upright rib 44. After the rib joint is opened the panel 41 may be pushed forward to form, with fold-back panels 57 and 58, a pouring spout. It will be evident that when the carton is opened and the pouring spout is formed, the fold-back panels 57 and 58 are readily visible while in the closed position the fold-back panels 57 and 58 are largely hidden from view.

In like manner, the top of the carton opposite the pouring spout may be opened by applying an upward and outward force to the carton top to fold the panels 38 and 40 along score lines 48 and 51 whereby the heat-sealed joint in the upright rib 44 is broken. After the rib joint is broken, the panel 39 may be pushed forward to expose the fold-back panels 55 and 56 which, prior to the breaking of the rib joint, were largely hidden from view (FIG. 3).

In the manufacture of cartons of the type illustrated in FIGS. 1, 2 and 3, it is customary to print a design on the blank in one or more colors. For example, in FIG. 1, panels 29–32 and 38–41 of blank 20 may be reverse printed with a colored alkali-sensitive flexographic ink so that the desired design 65 and merchandising copy 66 are formed on the unprinted areas of the blank 20. If desired, additional advertising copy or design 67 may be overprinted on the blank 20 by using a different color of flexographic ink.

Figure 7:
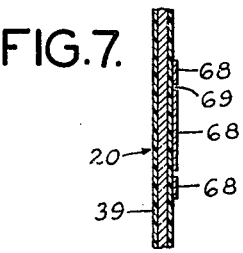
FIG. 7 is an enlarged vertical cross-sectional view taken along line 7—7 of FIG. 4.

FIG. 4 is a schematic view of a portion of the blank 20 shown in FIG. 1 comprising a paper material coated on each side with a polyethylene material and may represent, for example, a portion of the panel 39. The rectangular area 68 indicates, schematically, an area which has been printed with a colored flexographic ink except for the annular ring 69 so that the annular ring 69 will contrast with the area surrounding it. FIG. 7 is a cross-sectional view taken along line 7—7 of FIG. 4 which shows how the annular ring design may be formed by applying colored ink 68 to the blank 20 except in the area of the annular ring 69.

Figure 5:
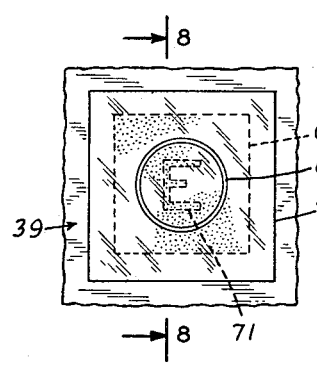
FIG. 5 is an enlarged fragmentary view of the printed plastic-coated paper substrate shown in FIG. 4 which has been overprinted with an alkali-resistant transparent ink to form an invisible mark by reverse printing.
Figure 6:
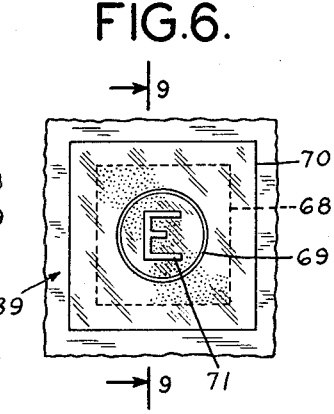
FIG. 6 is an enlarged fragmentary view of the overprinted coated paper substrate shown in FIG. 5 after having been treated to make the invisible mark visible.
Figure 8:
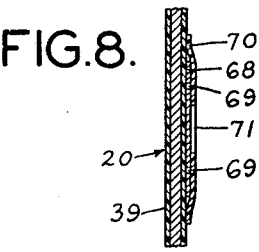
FIG. 8 is an enlarged vertical cross-sectional view taken along line 8—8 of FIG. 5.
Figure 9:
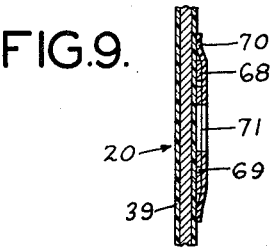
FIG. 9 is an enlarged vertical cross-sectional view taken along line 9—9 of FIG. 6.

FIG. 5 is a schematic view similar to FIG. 4 which shows the additional step of overprinting the rectangular area 68 with a transparent alkali-resistant ink 70 except in the area 71 which may comprise any desired design or symbol, in this instance, a capital "E." The area 71 in FIG. 5 is indicated by broken lines since, after the overprinting operation, the area 71 will be substantially indistinguishable from the other printed portions of the area 68 provided that the ink 70 is substantially transparent and has gloss and reflectance characteristics similar to those of the colored ink 68 used in the first printing operation. FIGURE 8 is a schematic cross-sectional view taken along line 8—8 of FIG. 5 which shows how the transparent ink 70 is applied to cover the colored ink 68 and the annular ring 69 except in an area 71 which defines any desired invisible mark or symbol, e.g. a capital "E."

As purchased by the consumer, the carton of FIG. 2 will contain an invisible mark 71 produced by overprinting with a transparent ink 70 a portion of a printed area 68 as shown in FIGS. 4 and 5. In order to render the invisible mark 71 visible, the consumer treats the area within and around the annular ring with an alkali or alkaline solution such as soap, wet cleanser or household ammonia. Since the alkali or alkaline solution will react preferentially with the alkaline-sensitive colored ink 68 but will be resisted by the transparent ink 70, the alkaline-sensitive ink 68 in the area 71 which is exposed to the alkaline solution will be removed and the area 71 will become clearly visible thereby making visible the heretofore invisible mark.

FIGS. 4–9 illustrate a preferred embodiment of the invention wherein the transparent ink is applied by reverse printing over a relatively large area so that the printing pressure may be readily controlled to avoid forming any impression on the paper. However, the principles of the present invention may alternatively be applied by direct printing as shown schematically in FIGS. 10 through 15 which correspond respectively to FIGS. 4 through 9.

Figure 10:
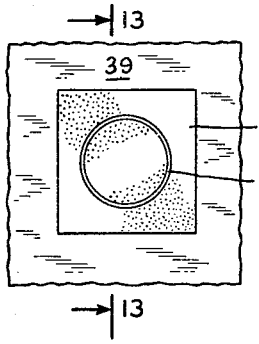
FIG. 10 is an enlarged fragmentary view of a plastic coated paper substrate similar to FIG. 4 and illustrating a colored alkali-sensitive inked area.
Figure 11:
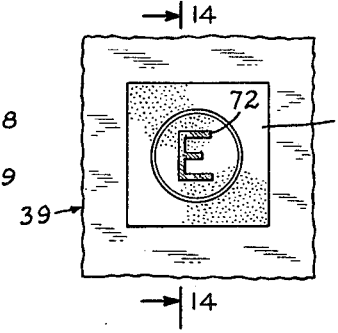
FIG. 11 is an enlarged fragmentary view of the printed plastic-coated paper substrate shown in FIG. 10 overprinted with an alkali-resistant transparent ink to form an invisible mark by direct printing.
Figure 12:
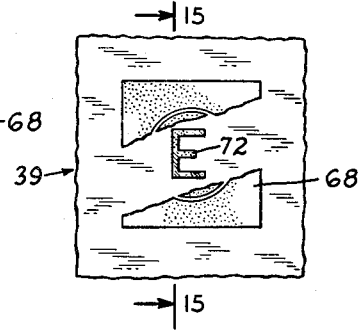
FIG. 12 is an enlarged fragmentary view of the overprinted coated paper substrate shown in FIG. 11 after having been treated to make the invisible mark visible.
Figure 13:
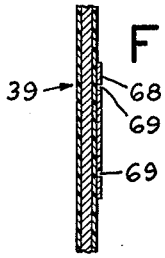
FIG. 13 is an enlarged vertical cross-sectional view taken along line 13—13 of FIG. 10.
Figure 14:
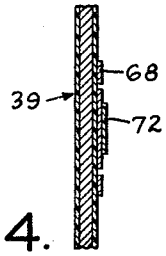
FIG. 14 is an enlarged vertical cross-sectional view taken along line 14—14 of FIG. 11.
Figure 15:
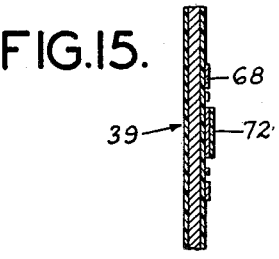
FIG. 15 is an enlarged vertical cross-sectional view taken along line 15—15 of FIG. 12.

Referring to FIGS. 10 and 13 the polyethylene-coated paper substrate 39 is printed with an alkali-sensitive colored flexographic ink 68 so as to form any desired design, e.g. an annular ring 69. As indicated schematically in FIGS. 11 and 14, the substrate 39 printed with the alkali-sensitive ink 68 is overprinted with a transparent alkali-resistant ink to form a substantially invisible mark 72. Of course, it will be understood that although the mark 72 is shown clearly in FIGS. 11 and 14, it will not, in fact, be readily apparent to the eye since it is formed by a transparent ink having gloss and reflectance characteristics similar to those of the colored ink 68.

When it is desired to make the invisible mark visible, the area in which the mark has been printed is treated with an alkali or alkaline solution such as soap, wet cleanser or household ammonia. The result of such treatment is indicated schematically in FIGS. 12 and 15 which show a substrate 39 printed with a colored ink 68 and overprinted with a mark 72 in transparent ink. The alkaline solution will react with and remove the alkaline-sensitive ink 68 except in the area of the printed mark 72 where the alkali-resistant transparent ink protects the colored ink from attack.

As stated above, ordinary colored flexographic inks may be used for printing the substrate. The following examples indicate ranges of formulations of transparent ink which may be used to form the invisible mark, the proportions being varied in order to match the gloss and reflectance properties of the particular colored ink used to print the substrate material.

EXAMPLE 1

| | Percent |
|---|---|
| ATC 7145 overprint (Sinclair and Valentine Co.) | 95.0–100.0 |
| Cabosil | 5.0–0.0 |

EXAMPLE 2

| | |
|---|---|
| E–24858 (Interchemical Corp.) | 95.0–100.0 |

EXAMPLE 3

| | |
|---|---|
| Versamid 940 | 30.0–40.0 |
| Heptane | 30.0–35.0 |
| Iso-propanol (99%) | 30.0–35.0 |
| Cabosil | 0.0–5.0 |

EXAMPLE 4

| | |
|---|---|
| ¼ Sec. SS Nitrocellulose | 6.0–10.0 |
| Santicizer 141 | 3.0–5.0 |
| Cabosil | 0.0–5.0 |
| Ethyl Cellosolve | 3.0–5.0 |
| Ethyl acetate | 7.0–5.0 |
| Ethyl alcohol | 65.0–80.0 |

The following examples of commercially available alkali-sensitive colored flexographic inks may be used with any of the transparent inks referred to in Examples 1 through 4.

| Color Designation | Manufacturer's Designation | Manufacturer |
|---|---|---|
| Example 5.... P–332 Red | PA–5663 | Sinclair and Valentine Co. |
| Example 6.... P–305 Red | E–27371 | International Printing Ink Co. |
| Example 7.... P–424 Purple | 68R1165 | International Printing Ink Co. |
| Example 8.... P–615 Green | P–67–1644 | Sun Chemical Company. |

About 10% ethyl alcohol is commonly added to each of the above inks.

As a further specific example of the method of the present invention, a color proof-print of the ink of Example 5 was applied to milk carton stock as the first printing operation, followed by overprinting the letter "M" using the alkali-resistant transparent varnish of Example 1. The print was dried for 30 seconds at 72.° C. in a forced-air oven. After cooling for one minute the print was rubbed by hand using a small amount of wetted "Lava" brand soap. The letter "M" printed with the transparent ink or varnish which was practically invisible prior to the application of the alkaline cleanser became visible as the surrounding alkali-sensitive ink was washed away with the cleanser.

The preferred location of the invisible mark is a position where it is relatively inaccessible to view. For this reason, the mark is shown to be located on one of the fold-back panels of the gable top in the container illustrated in FIGS. 1–3. In particular, the invisible mark has been placed on the fold-back panel of the rear side of the gable so as to be adjacent the advertising copy related to the invisible mark and cause no interference with the appearance of the front panel of the container. Of course, the invisible mark may be applied to any other location on the container as desired. When the invisible mark is to be applied to bags made from plastics or films where the bag has no relatively inaccessible portion corresponding to the fold-back panel of the gable top container it may be found desirable to apply the mark on the back of the bag.

Although the method of the present invention has been described in connection with the flexographic process of printing, other printing methods, such as letterpress, offset or gravure may also be used.

While the invention has been described in connection with specific embodiments thereof and in specific uses, various modifications thereof will occur to those skilled in the art without departing from the spirit and scope of the invention as set forth in the appended claims.

What is claimed is:

1. A method for applying an invisible mark on a printable substrate, comprising printing at least a portion of said substrate with a first ink and overprinting a selected part of said portion with a second ink, said first ink being a colored alkali-sensitive ink and said second ink being a substantially transparent alkali-resistant ink.

2. A method for applying an invisible mark on a merchandising container comprising printing at least a portion of a container blank with a colored alkali-sensitive ink and overprinting a part of said printed area with a substantially transparent alkali-resistant ink except in an area defining a desired mark whereby upon treatment with an alkali the colored alkali-sensitive ink will be removed in the area defining the desired mark to make said mark visible.

3. A method for applying an invisible mark on a merchandising container comprising printing at least a portion of a container blank with a colored alkali-sensitive ink and overprinting a part of said printed area with a substantially transparent alkali-resistant ink in an area defining a desired mark whereby upon treatment with an alkali the colored alkali-sensitive ink surrounding said area defining said mark will be removed to make said mark visible.

References Cited

UNITED STATES PATENTS

| | | | |
|---|---|---|---|
| 356,695 | 1/1887 | Reid et al. | 117—1.7 X |
| 1,528,925 | 3/1925 | Imhof et al. | 117—1.7 |
| 2,445,586 | 7/1948 | Simons | 117—1 |

OTHER REFERENCES

Ellis, Carleton, "Printing Inks," Rheinhold Publishing Co. 1940, pages 368, 369, 480 and 481.

Apps, E. A., "Inks for the Minor Printing Processes and Specialized Applications," Leonard Hill (London), 1963, pages 78, 79 and 181.

WILLIAM D. MARTIN, Primary Examiner

EDWARD J. CABIC, Assistant Examiner

U.S. Cl. X.R.

117—8, 45; 206—47; 229—17

PO-1050
(5/69)

UNITED STATES PATENT OFFICE
CERTIFICATE OF CORRECTION

Patent No. 3,498,815　　　　　　　　Dated　March 3, 1970

Inventor(s) F. E. Bichaylo, H. R. Moors and E. F. Scariano

It is certified that error appears in the above-identified patent and that said Letters Patent are hereby corrected as shown below:

Column 2, line 16, "work Many" should read --work. Many--

Column 3, line 14, "drawing" should read --drawings--

Column 3, line 17, after "paper" insert --board--

Column 3, line 51, "hereafter, in" should read --hereafter. In--

Column 5, Example 2, after the line reading "E-24858 (Interchemical Corp.) ---------- 95.0-100.0" insert the following line: --Cabosil ---------- 5.0-0.0--

Column 5, Example 4, line 71, "7.0-5.0" should read --7.0-10.0--

SIGNED AND
SEALED
JUL 14 1970

(SEAL)
Attest:

Edward M. Fletcher, Jr.
Attesting Officer

WILLIAM E. SCHUYLER, JR.
Commissioner of Patents